United States Patent [19]

Murakami et al.

[11] 4,008,630
[45] Feb. 22, 1977

[54] FLUID PRESSURE CONTROL SYSTEM FOR AUTOMATIC TRANSMISSIONS

[75] Inventors: Noboru Murakami, Nagoya; Koichiro Hirosawa, Kariya both of Japan

[73] Assignee: Aisin Seiki Kabushiki Kaisha, Kariya, Japan

[22] Filed: Sept. 17, 1974

[21] Appl. No.: 506,884

[30] Foreign Application Priority Data

Sept. 18, 1973 Japan .............. 48-105668

[52] U.S. Cl. .................... 74/865; 74/869
[51] Int. Cl.² ........................ B60K 41/18
[58] Field of Search ........ 74/867, 868, 869, 752 C, 74/864, 865

[56] References Cited
UNITED STATES PATENTS

| | | | |
|---|---|---|---|
| 3,561,293 | 2/1971 | Fujita et al. | 74/869 |
| 3,563,115 | 2/1971 | Iijima et al. | 74/869 |
| 3,651,714 | 3/1972 | Ohya et al. | 74/869 X |
| 3,667,323 | 6/1972 | Irie | 74/869 X |
| 3,685,372 | 8/1972 | Miyazaki | 74/869 X |
| 3,707,890 | 1/1973 | Ito | 74/868 |
| 3,710,652 | 1/1973 | Miyazaki | 74/869 X |
| 3,818,783 | 6/1974 | Norris et al. | 74/869 |
| 3,831,465 | 8/1974 | Murakami | 74/869 |
| 3,859,873 | 1/1975 | Miyauchi et al. | 74/868 X |
| 3,871,250 | 3/1975 | Miyauchi et al. | 74/869 |

*Primary Examiner*—Samuel Scott
*Assistant Examiner*—Lance M. Chandler
*Attorney, Agent, or Firm*—Pierce, Scheffler & Parker

[57] ABSTRACT

A fluid pressure control system for automatic transmission includes a fluid pressure source, a fluid pressure regulating valve for regulating the fluid from the source to a particular line pressure, and a plurality of frictional engaging devices, adapted to be actuated by the line pressure through means of a manual shift valve, for attaining a particular gear ratio within the gear trains of the transmission which are interposed between the input and output shafts. A governor valve generates a governor pressure in response to the rotational speed of the input shaft, a throttle valve generates a throttle pressure in response to the engine throttle valve, shift valve selectively actuates the frictional engaging devices in response to the governor and throttle pressures, and a reducing valve actuates to restrict the throttle pressure to a threshold calibration value when the throttle pressure exceeds the value.

4 Claims, 5 Drawing Figures

FLUID PRESSURE CONTROL SYSTEM FOR AUTOMATIC TRANSMISSIONS

BACKGROUND OF THE INVENTION

This invention relates to an automatic transmission for vehicle and more particularly to a fluid pressure control system for governing a planetary or epicyclic gear trains employed in the transmission.

As used herein, the term "low position" refers to a high ratio differential achieved by the planetary gear trains adapted for the slowest travelling speed of the vehicle.

The term "second position" refers to a middle level ratio differential achieved by the gear trains adapted for the middle level vehicle travelling speed.

The term "top position" refers to a position in which the entire mechanism of the gear trains is locked together as a unit and is rotated in integral with an input shaft for achieving a higher travelling speed of the vehicle.

In known automatic transmission, there is usually a time lag in restoring the gear trains to the original mode of operation of low ratio differential after sudden or urgent acceleration, so-called "kick down", of the vehicle is completed by a high ratio differential.

SUMMARY OF THE INVENTION

A principal object of the present invention therefore is to provide a fluid pressure control system having improved means for restricting the throttle pressure to a predetermined threshold value so that the pressure control system is enabled to restore the gear trains to its original position of low ratio differential as soon as acceleration of the vehicle by a high ratio differential is ceased.

The foregoing object and others are attained according to at least one aspect of the present invention through the provision of valve means to restrict the throttle pressure under a threshold predetermined value so that the gear trains may be restored to its original position against such restricted throttle pressure readily.

Thus, in the disclosed embodiments, a pressure restricting valve is provided fluidically connected to the throttle valve to have the throttle pressure in excess of the predetermined one to escape into a reservoir under the atmospheric pressure.

DETAILED DESCRIPTION OF THE PREFERRED EMBODIMENTS

Figure 1:
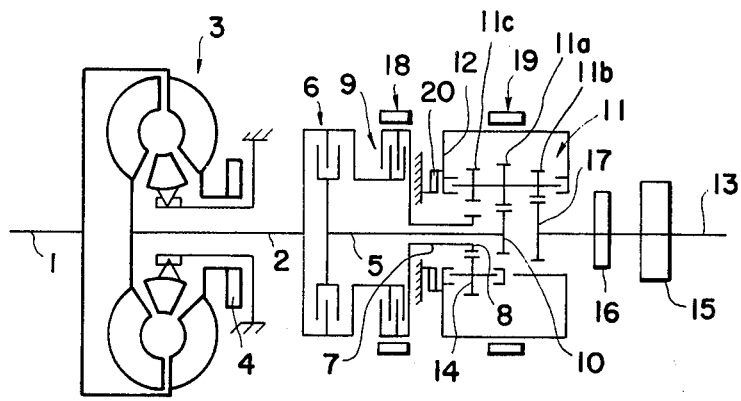
FIG. 1 is a diagrammatic view of a transmission gearing according to the invention.

In FIG. 1 is shown an outline of an automatic transmission with which cooperates the fluid pressure control system according to the invention. An input shaft 1 drives a first middle shaft 2 through a torque convertor 3. An oil pump 4 is driven by means of the vehicle engine, not shown, through the input shaft 1 and the oil pumped thereby is transmitted into the oil pressure control circuit as will be described in detail as the description proceeds. The first middle shaft 2 drives a second middle shaft 5 through a clutch 6. On the second shaft 5 is free running fit a hollow shaft 7. At one end of the hollow shaft 7 is formed with second sun gear 8 and at the other end thereof is provided with a second clutch 9. The second middle shaft 5 has a first sun gear 10 at its right hand end. The first sun gear 10 meshes with a middle gear 11a of planetary gear set generally indicated by the reference character 11. The planetary gear set 11 is rotatably supported on a planetary carrier 12. The planetary gear set 11 also has gears 11b and 11c both integral with the other gear 11a. The gear 11b meshes with a third sun gear 17 which is fast on an output shaft 13 of the fluid transmission. The gear 11c meshes with an idle gear 14 through an intermediate gear (not shown), and the idle gear in turn meshes with the second sun gear 8. The carrier 12 is rotatable coaxially with the second middle shaft 5. The input shaft 1, the first second middle shafts 2 and 5 and the output shaft 13 are in alignment with one another. The governor 15 is driven by the output shaft 13 and its output pressure is proportional to a rotational speed of the output shaft 13. The governor is of conventional construction and its operation and use is well known in the art so that the detailed description is not required for full understanding of the invention. The reference character 16 indicates another oil pump driven by the output shaft 13. The output fluid pressure from the oil pump 16 is governed by the valve 15 in dependency upon the rotational speed of the output shaft 13. Such output fluid pressure is used for the control system according to the invention as hereinbelow described as the discussion proceeds.

A brake 18 is provided for achieving prohibition and allowance of the rotation of the hollow shaft 7. Another brake 19 is provided for achieving prohibiting and allowing rotation of the carrier 12. The brakes 18 and 19 operate due to fluid pressure applied thereto from the oil pump 4 or 16. A brake 20 prevents the carrier from in one direction rotation while permitting the reverse direction rotation as one-way brake.

In the application of the gear trains, there are four modes of operation. The first mode of operation is achieved by keeping the gear trains in the low position, the second mode of operation is achieved by keeping the gear trains in the second position, and the third mode of operation is achieved by keeping the gear trains in the top position. The fourth mode of operation is achieved when the gear trains is in a position in which the output shaft is driven in the inverse rotational direction, rearward travelling of the vehicle being thus effected.

In the first mode of operation, the clutch 6 and the brake 19 are in their operation position while the clutch 9 and the brake 18 are in rest position. As a result, the input torque is transmitted from the input shaft 1 via torque convertor 3, first middle shaft 2, clutch 6, second middle shaft 5, first sun gear 10, middle gear 11a, gear 11b, third sun gear 17 and output shaft 13 to driving wheels of the vehicle (not shown). In the mode, the carrier is kept stationary. The low position, namely the highest ratio differential of the gear trains results from the first mode and the large pulling power of the vehicle is obtained at the travelling speed.

In the second mode of operation, the clutch 6 is in act and clutch 9 and brake 18 are in the rest position while the brake 19 is replaced by the brake 20. Since the brake 20 is operative in preventing the carrier 12 from rotating in a reaction torque direction in the low position, the same low position is achieved in that second mode of operation. If the brake 18 becomes operated in the second mode of operation, the second sun gear 8 becomes stationary and the carrier 12 is applied the reverse direction reaction torque. As a result, the brake 20 permits rotation of the carrier in such rotational direction. Since the second sun gear 8 is stationary and the carrier 12 is rotatable, rotation of the first sun gear 10 is transmitted to the output shaft 13 with a result that the shaft 13 is rotated with a ratio differential lower than that of the low position. A middle level travelling speed thus may be effected for the vehicle.

In the third mode of operation, both clutches 6 and 9 are in act while the brakes 18 and 19 are in rest position. As a result, both sun gears 10 and 8 become integral as a unit. The entire mechanism of the gear trains is locked together as a unit and is rotated in integral with the first middle shaft 2 and the output shaft 13. The top position is thus effected and the high travelling speed of the vehicle is achieved.

In the fourth mode of operation, the clutch 9 and the brake 19 are in act while the clutch 6 and the brake 18 are inoperative. The carrier 12 is kept stationary and the second sun gear 8 becomes driving gear so that the sun gear 8 drives, via idle gear 14, gear 11c, gear 11b and the third sun gear 17, the output shaft 13 in the direction reverse to that of the first to third modes of operation. The rearward travelling of the vehicle is thus effected.

If both clutches 6 and 9 and both brakes 18 and 19 are all in the rest position, no torque is transmitted from the input shaft 1 to the output shaft 13. This mode is referred to as "neutral mode" hereinafter.

Figure 2:
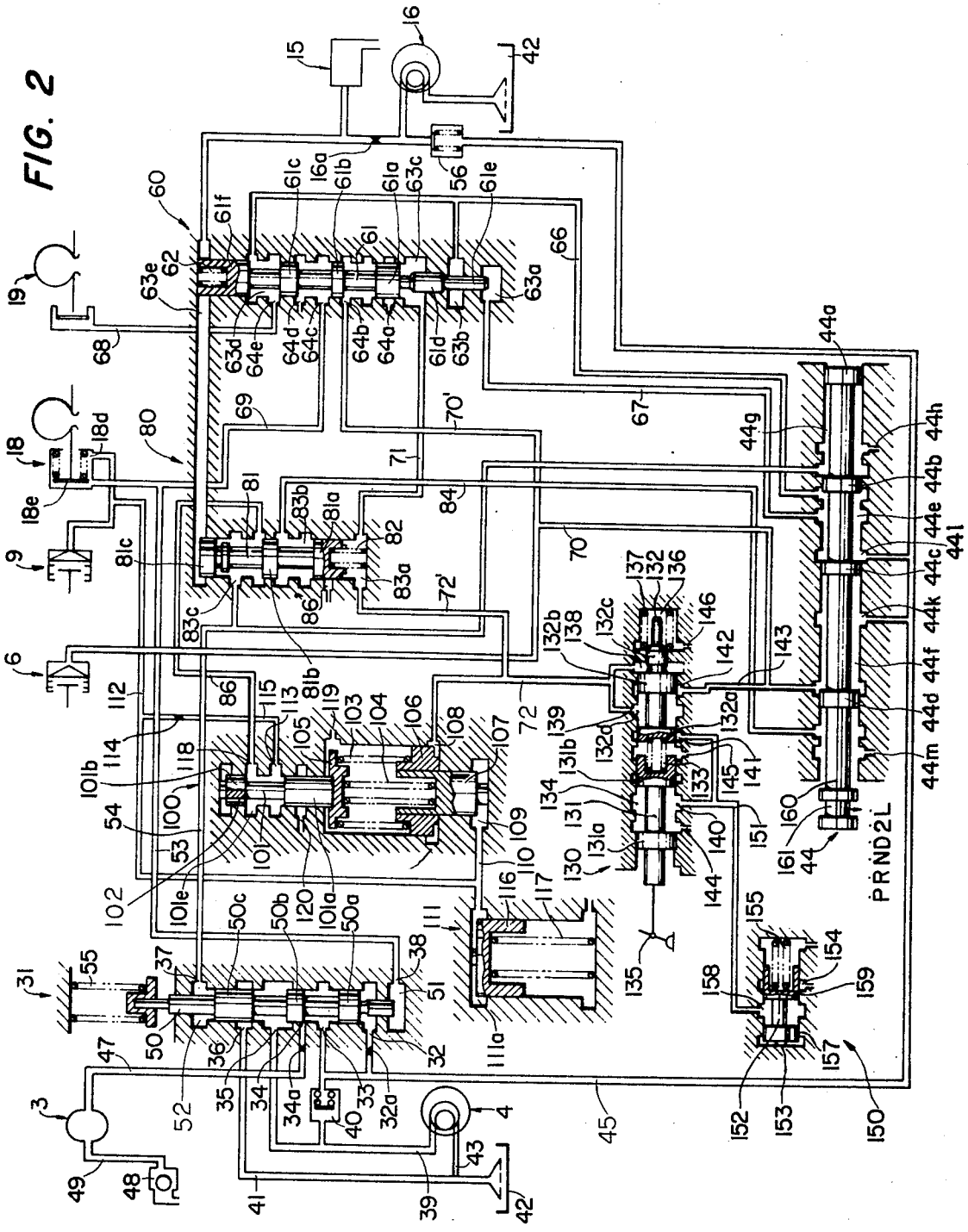
FIG. 2 is a diagrammatic illustration of a fluid control system for the transmission gearing.

In FIG. 2, an oil pump 4 is driven by the vehicle engine, not shown, and the oil pumped thereby is transmitted into the pressure control circuit. A regulator valve, generally indicated by the reference character 31, includes ports 32 to 38. The pressurized oil from the pump 4 is transmitted into port 32 through means of conduit 39 and into port 33 through means of conduit 39 and a branch conduit on which is disposed a check valve 40. The pressurized oil is also transmitted into the port 35 through means of conduit 39. A conduit 41 connects the port 36 with a reservoir 42. A suction pipe 43 of the pump 4 leads to the reservoir 42. The torque converter 3 is supplied the lubricant oil through means of conduit 47 from the port 34. A check valve 48 is connected to the torque converter 3 through means of conduit 49 to have the fluid escape at a pressure exceeding a predetermined value. An orifice 34a is provided on the conduit 47 to keep the fluid pressure to the converter at a lower value than that of pressure which is applied to the clutches and brakes. The ports 32 and 33 are connected to the manually shiftable valve, generally indicated by the reference character 44, through means of conduit 45.

The regulator valve 31 includes a valve spool 50 having three lands 50a, 50b, and 50c and fluid chambers 51 and 52. The lands are of the same diameter and cooperate with the ports selectively to regulate the input pressure as a pressure suitable to apply to the clutches and the brakes. Such suitable or proper fluid pressure is referred to hereinafter as "line pressure". The spool 50 is applied on its lowermost end the line pressure. The land 50c is applied on its face the line pressure within the chamber 52 and land 50a is applied on its lower end face the line pressure from the port 32. An orifice 32a is provided at the port 32 for preventing the spool from vibration when the line pressure is applied through the conduit 45 and port 32.

The chamber 51 is connected fluidically to a first shift valve, generally indicated by the reference character 60, through means of conduits 53 and 69 and the chamber 52 is fluidically connected to the manual shift valve 44 through means of conduit 54. When the oil pressure is applied to the lower face of the lower land 50a, and/or lower end face of the spool 50 through the ports 32 and 38 respectively the opening and closing of a discharging port 36 of the valve 31 is controlled by means of the land 50c of the valve spool against the biasing force of a restoring spring 55, which is associated with the end of spool 50 opposite that end upon which is disposed land 50a. The pressure applied to the lower face of the land 50a may be associated with a line pressure transmitted into chamber 51 as more fully described as the discussion proceeds. As a result of such controlling achieved by the land 50c and the port 36, a regulated output line pressure is supplied to the conduit 45 owing to a calibration threshold of the spring 44. Such regulated line pressure may be decreased by supplying the line pressure into the lowermost chamber 51 of the valve 31, by an amount which is proportional to an area of the lowermost end face of the spool 50. This is intended to provide a comparatively lower line pressure for the clutch 6 and the first brake 18 when the second mode of operation is initiated and to prevent an enertial shock as would otherwise be exhibited each time the gear train in FIG. 1 changes the mode of operation. The pump 16 which is driven by the output shaft 13 supplies fluid pressure and the governor 15 causes the output pressure of the pump to vary by an amount which is proportional to rotation speed of the shaft 13 representing normally a travelling speed of the vehicle. Immediately after the initiation of operation, an output pressure of the pump 16 overcomes a calibration threshold of a spring of a check valve 56. The fluid pressure is applied to the conduit 45 in addition to the precedingly applied pressure by the other pump 4. The total pressure is higher than the precedingly supplied pressure by the pump 4 alone. a result the spool 50 of the regulator valve 31 is upward moved a distance which is proportional to a resulting biasing force of the spring 55.

The pressure regulation which precedingly performed by the port 36 and the land 50c is thereafter replaced by pressure regulation of the land 50b and port 36 which repeatedly or intermittently permits the ports 36 and 33 to connect.

From the foregoing it will be understood that after the pump 16 has become driven by initiation of travel of the vehicle, the ports 35 and 36 are connected and the pump 4 is in idling position. It will be further understood that the check valve 40 is thereafter closed and the check valve 56 is opened. Since rotational speed of the engine varies by a large amount, such substitutional employment of the pump 16 is effective to avoid difficulty in calculating a large regulating capacity of a regulating valve as would continuously operate throughout both engine idling and subsequent vehicle travelling periods.

A shift valve 60 similarly includes a valve spool 61, having six lands 61a to 61f. The lands 61a to 61c and 61f are of the same diameter. The land 61d is of smaller diameter than any one of the upwardly disposed lands and the land 61e is of smaller diameter than the land 61d. The valve 60 further includes a spring 62 associated with an end portion of the spool 61 opposite that end upon which is disposed land 61e which normally biases the spool 61 in the downward direction as seen in FIG. 1. The chamber 63a is connected with the manually operable valve 44 through conduit 67 while the other chambers 63b and 63d are connected with the valve 44 through conduit 66. The valve 60 has ports 64a, 64b, 64c, 64d and 64e. The ports 64a and 64d lead to the reservoir 42. The port 64e leads to the brake 19 through conduit 68 and port 64c leads to an engaging chamber 18e of the brake 18 through conduit 69. The port 64b leads via a branch conduit 70: and conduit 70 to the manually operable valve 44. The chamber 63c is connected via conduit 71 with another shift valve 80.

The second shift valve 80 includes also a valve spool 81 having three lands 81a, 81b and 81c, and a spring 82 associated with the end of spool 81 opposite that end which is disposed land 81c, which normally biases the spool 81 in the upward direction as viewed in FIG. 2. The lands 81a, 81b and 81c are of the same diameter. The shift valve is normally urged to the position shown in FIG. 2 as a result of the biasing force of spring 82, and the lowermost chamber 83a is connected via conduit 771 to the chamber 63c of the valve 60. The chamber 83b defined between the lands 81a and 81b is connected via means of conduit 84 to the manual shift valve 44. The chamber 83c is connected through means of conduit 54 to the manually shift valve 44 while being connected through means of another conduit 86 to a control valve 100. A port 86: is connected to the reservoir 42. The uppermost land 81c exposes its end face to the fluid pressure within the said chamber 63e.

The control valve 100 includes a valve spool 101, having two lands 101a and 101b which has a small hole 102 for applying fluid pressure to lower the spool downwardly. Both lands 101a and 101b are of the same diameter. A pair of compression springs 103 and 104 are arranged to normally bias the spool in the upward direction as viewed in FIG. 2. The uppermost extremity of each of the springs is together anchored to the retainer 105 but the lowermost end of the spring 103 is anchored to an outer annular piston 106 and the inner spring 104 is anchored at its lowermost end to the inner piston 107. The outer piston exposes its face to fluid pressure within a chamber 108 while the inner piston exposes its face to fluid pressure within a chamber 109. The chamber 109 is connected through means of conduit 110 to a accumulator tank 111. The conduit 110 has a branch conduit 112 leading to the clutch 9 and a disengaging chamber 18d of brake 18. The conduit 112 further has a branch conduit 115 which leads to port 113 and has an orifice 114. The accumulator tank 111 includes a piston 116 and a spring 117 associated with the back of the piston 116 which normally biases the piston in the upward direction as seen in the view. The valve 100 has an uppermost port 118 which is connected to the conduits 86 leading to the valve 80. The other ports 119 and 120 lead to the reservoir 42 through means of conduit, not shown.

A throttle valve 130 includes a plug 131 having two lands 131a and 131b of the same diameter, movable within the left end portion thereof, a valve spool 132 having a plurality of lands 132a, 132b and 132c, and a spring 133, which is interposed between plug 131 and valve spool 132, for urging the plug 131 into the rest position of the pedal 135. A chamber 136 is defined within the right end portion of the valve 130 and has spring 137 disposed therewithin. Ports 138 and 139 are together connected to the chamber 108 of the control valve 100. Ports 140 and 141 are connected with a second regulator 150 through means of conduit 151 and its branch conduits. A port 142 is connected to the manual shift valve 44 through means of conduits 143 and 70.

The other ports 144, 145 and 146 are connected with the reservoir 42.

The second regulator valve 150 includes a spool 152 having two lands 153 and 154 disposed thereon, and a spring 155 associated with the end of spool 152 opposite that end upon which is disposed land 153 which normally biases the spool 152 in the leftward direction as viewed in the FIG. 2. A port 154 is connected to the reservoir 42. The land 153 has a small hole 157 which connects a chamber defined between the two lands 153 and 154 to another chamber defined between the internal end face of the valve 150 and the land 153 so that fluid pressure applied through the port 158 urges the spool against the spring 155.

The manual shift valve 44 includes a valve spool 160 having a plurality of lands 44a, 44b, 44c and 44d. An annular groove 161 engages a manual shift valve lever (not shown) to be axially shifted by the driver to vairous positions designated L, 2, D, N, R, and P so that the clutches and brakes are selectively actuated by the line pressure through the control system.

The operation of the embodiment in FIG. 2 will now be described hereinbelow in detail. Assume that the manual shift valve 160 is positioned to the low position designated L. The line pressure from the pump 4 or 16 is regulated by means of the regulator valve 31 and is supplied to conduit 45. Such line pressure is able to be transmitted to the conduits 66 and 67 through means of chamber between the lands 44b and 44c of the valve 44. The second brake 19 is thus able to engage as a result of the line pressure being transmitted through the conduit 66, chamber 63d and conduit 68 and this line pressure is also supplied via conduit 66 to chamber 63b of the first shift valve 60. Further the pressure is transmitted to the chamber 63a through conduit 67. It should be noted that there is no chance for the spool 61 of the valve 60 to move to the other positions until the manual shift valve 44 is shifted to other positions due to fluid pressures in the chambers 63a, 63b and 63c which overcome the spring 62 and the maximum of the varying governor pressure in the chamber 63e.

The governor 15 produces a pressure by an amount which is proportional to a rotational speed of the output shaft 13. Such out put pressure is transmitted to the chamber 63e through its exhaust conduit as viewed in FIG. 2.

A chamber 44f of the manual shift valve 44 permits, in the mode in FIG. 2, the line pressure to be transmitted via conduit 70 to the first clutch 6 to operate thereof. The fluid pressure within the conduit 70 is also transmitted via its branch conduit 70: to the port 64b and in turn to a chamber defined between the lands 61a and 61b, which at this time, such chamber is closed. It should be noted that in such mode of operation, the second clutch 9 and disengaging chamber 18d of the first brake 18 are connected to the reservoir through conduits 112 and 115, port 113, chamber 101e, and port 118 of the second regulator valve 100, conduit 86, chamber 83c of the second shift valve 80, conduit 54, chamber 44g defined between lands 44a and 44b and port 44h of the manual shift valve 44. The engaging chamber 18e of the brake 18 is connected to the reservoir through conduit 69 and ports 64c and 64d. From the foregoing it will be understood that the first clutch 6 and the second brake 19 are in action while the second clutch 9 and the first brake 18 are disengaged.

Now referring to FIG. 1, it will be understood that the carrier 12 is stationary and sun gear 10 is in driving position. The clutch 9 and brake 18 are released. The output shaft 13 effects high ratio differential in the above mentioned mode of operation.

When the manual shift valve 44 is displaced from the above mentioned state to the second position designated 2, the land 44b blocks communication between the port 44l and the conduit 66. As a result, the brake 19 becomes applied no fluid pressure and released. No change is offered in applying fluid pressure to the other clutches or brake so that the preceding mode of operation continues until the governor pressure increases to a threshold calibration value. Such continuation of the previous mode is effected through substitutional actuation of the one-way brake 20. When the vehicle travelling speed increases, the governor pressure follows by an amount which is normally proportional to the rotational speed of the output shaft 13 or the travelling speed of the vehicle. At the stage when a predetermined threshold value is reached, the governor pressure within the chamber 63e and spring 62 overcomes a biasing force of fluid pressure within the chambers 63a and 63c. The fluid pressure within the chamber 63c is a throttle pressure which will be described hereinafter in detail.

The governor pressure is transmitted to the upper chamber 63e and the spool 61 of the first shift valve 60 is thus lowered to connect the engaging chamber 18e via conduit 69, port 64c and port 64b, conduits 70: and 70 and manual shift valve 44 to the line pressure conduit 45. Such line pressure is thus able to actuate the brake 18 to engage, the second sun gear 8 of the transmission being held stationary. The second position is achieved automatically. The reverse takes place also automatically in case of decrease of the governor pressure to a lower value than the threshold calibration value. It will be noted that the disengaging chamber 18d is connected in the above phase to the reservoir through conduits 112, 115, second regulator valve 100, conduit 86, chamber 83c of the second shift valve 80, conduit 54 and port 44h of the manual shift valve 44, the engaging of the brake 18 being thus permitted.

The operation of the throttle valve 130 will now be described in detail hereinbelow. When the input pressure is supplied to the throttle valve 130 from the manual shift valve 44 through conduits 70, 143 and port 142, the spool 132 operates to produce a regulated pressure by reciprocation as a throttle pressure by an amount of compression of the spring 133 which is proportional to a degree to which the engine throttle valve, not shown, is opened. The line pressure delivered into chamber 132d of valve 130 is then transmitted into the right hand chamber defined by lands 132b and 132c via ports 139 and 138. The spool 132 is therefore leftward moved against spring 133 so as to close the inlet port 142. Immediately after or at the same time when the inlet 142 is closed, the land 132a opens the outlet port 141 to permit fluid pressure in chamber 132d to escape via outlet port 141, conduit 151 and its branch conduit, port 140 and outlet port 144 to the reservoir. The fluid pressure in chambers 132d and the other chamber between lands 132b and 132c is decreased upon that escape and hence the spool 132 is moved to the original position shown by the spring 133. The spool 132 flutteringly repeats the cycle of reciprocation during the period of depression of the pedal 135 by the driver, and the desired regulated output throttle pressure which is proportional to or determined by the force of the compressed restoring spring 133 (degree of depression of the pedal) is thus obtained at outlet 139.

In the normal travelling, the throttle valve performs the above mentioned operation and produced an output pressure regulated as a throttle pressure which is proportional to the amount by which the pedal 135 is depressed.

However, when the pedal is suddenly depressed to meet a requirement for increasing the travelling speed of the vehicle, a different operation of the throttle valve is effected. The plug 131 of the throttle valve 130 is shifted to the right by such sudden depression with its land 131a closing port 144 leading to the reservoir so that input pressure in chamber 132d escapes via port 141 and conduit 151 into the reducing valve 150. The reducing valve 150 operates to produce an predetermined threshold pressure by the known reciprocal movement of the spool 152 associated by the force of the calibration threshold of the spring 155 and the exhausting port 154. The fluid pressure within the first chamber between the lands 153 and 154 transmitted through the orifice 157 into the second chamber between the land 153 and the internal end face of the valve 150. The spool 152 is accordingly moved to the right against the spring 155 to permit the fluid in the first chamber to escape through the outlet port 159 to the reservoir, thus reducing the fluid pressure. Fluid pressure in excess of the predetermined threshold valve is thus exhausted through the port 159 and the fluid pressure in chamber 132d of the throttle valve 130 controlled so as to vary below the maximum of such predetermined threshold value determined by the spring 155. By such operation, an output pressure in excess of the predetermined value is prevented from being transmitted through the conduit 72 to the second regulator valve 100 and through conduits 72 and 72: to the valve 80.

The operation of the second regulator valve or control valve 100 is then described in detail hereinbelow. In the position shown in FIG. 2, the uppermost port 118 of the second regulator valve 100 is connected to the reservoir through conduit 86, chamber 83c, conduit 54, chamber 44g and port 44h of the manual shift valve 44. When the spool 81 of the second shift valve 80 is shifted in the downward direction, the chamber 83c is isolated from the reservoir by its uppermost land 81c while being connected to the line pressure conduit 45 through conduit 84, and the chamber defined between the lands 44d and 44c of the spool 160, assuming that the chamber 44f is shifted to the left to connect conduit 84 thereto.

The line pressure supplied within the chamber 101e of the valve 100 is then transmitted via branch conduit 115, orifice 114 and conduit 112 to the chamber 111a of the accumulator tank 11, chamber 109 of the second regulator valve 100, disengaging chamber 18d of the brake 18 and the second clutch 9. By such line pressure in the chamber 101e, the spool 101 is downward moved against the biasing force of the springs 103 and 104 to have the fluid escape through the port 120 into the reservoir if pressurization in the chamber 101e exceeds the predetermined threshold value. The resulting output pressure from the chamber 101e is thus a pressure regulated by an amount which is proportional to the amount by which the springs are compressed. The outer spring 103 is compressed by the throttle pressure from throttle valve 130 variable to an amount which is proportional to the amount by which the pedal 135 is depressed. The provision of spring 103 and outer piston 106 is contemplated to keep the output pressure in chamber 101e proportional to the throttle pressure in chamber 108, so that a proportional tightening force is applied to the clutch 9 to the torque to be transmitted. The provision of spring 104 and inner piston 107 is contemplated to cause the piston 101a to gradually increase the output pressure in chamber 101e.

The clutches and brakes of the embodiment are usually employed in the form of multiple disc type or band type frictional clutch and brake. It should be noted that, for given purpose, the frictional force or tightening force exerted in such frictional device is proportional to depression of the pedal, so that the larger the depression of the pedal the greater will be the frictional force. The variable throttle pressure from the throttle valve 130 meets such requirement.

Since the line pressure within the chamber 101e of the second regulator valve 100 is transmitted through orifice 114 to the chamber 109, the resulting pressure in the chamber 109 is lower than the line pressure. Such resulting pressure is further regulated by action of the compression spring 117 and piston 116 of the accumulator tank 111. The resulting pressure in the chamber 109 serves to upwardly move the inner piston 107 to thereby further compress the spring 104 and in turn increase the threshold value of the line pressure in the chamber 101e. Such cycle of pressurization is repeated for a while immediately after the application of the line pressure is initiated to the chamber 103e, and gradual increase of output pressure thus resulting. The gradual increase is effective to prevent the clutches and brakes from a shocking operation resulting from a sudden change of travelling speed of the vehicle, such gradual increase being translated exactly into increase of input pressure to the clutches and brakes.

When the spool 160 of the manual shift valve 44 is shifted to the D position, the line pressure is transmitted to the chamber 83b of the valve 80 through conduit 84 on connection of the conduit 84 with the chamber 44f, which is at this time connected to the line pressure conduit 45 through port 44k. The line pressure in the chamber 83b remains closed within the chamber 83b until the spool 81 is downward moved by a governor pressure within the chamber 63e which exceeds a predetermined threshold value.

Such downward movement of the spool 81 causes the chamber 83c to be isolated from the conduit 54 connected to the reservoir while being connected to the conduit 86 leading to the second regulator valve or control valve 100, namely to its chamber 101e. The chamber 83c is further connected by such shift down to the conduit 84 leading to line pressure in D position. The line pressure transmitted to the chamber 101e is thence transmitted to the second clutch 9 and disengaging chamber 18d of the brake 18. Reverse takes place in dependency upon the decrease of the governor pressure over the predetermined threshold one.

It will be noted that in D position of the manual shift valve 44, the shift valve 60 is of course downward shiftable due to the governor pressure which imposes also downward shift of the spool of the shift valve 80.

It will be further noted that in the D position, the gear trains varies automatically from low position to the second position and further to the top position. Reverse takes place from the top or second place.

When the spool 160 of the manual shift valve 44 is in the position designated N in FIG. 2, each clutch and each brake is freed from the line pressure and no torque is transmitted from the input shaft 1 to the output shaft 13. The neutral position is thus achieved.

Figure 3:
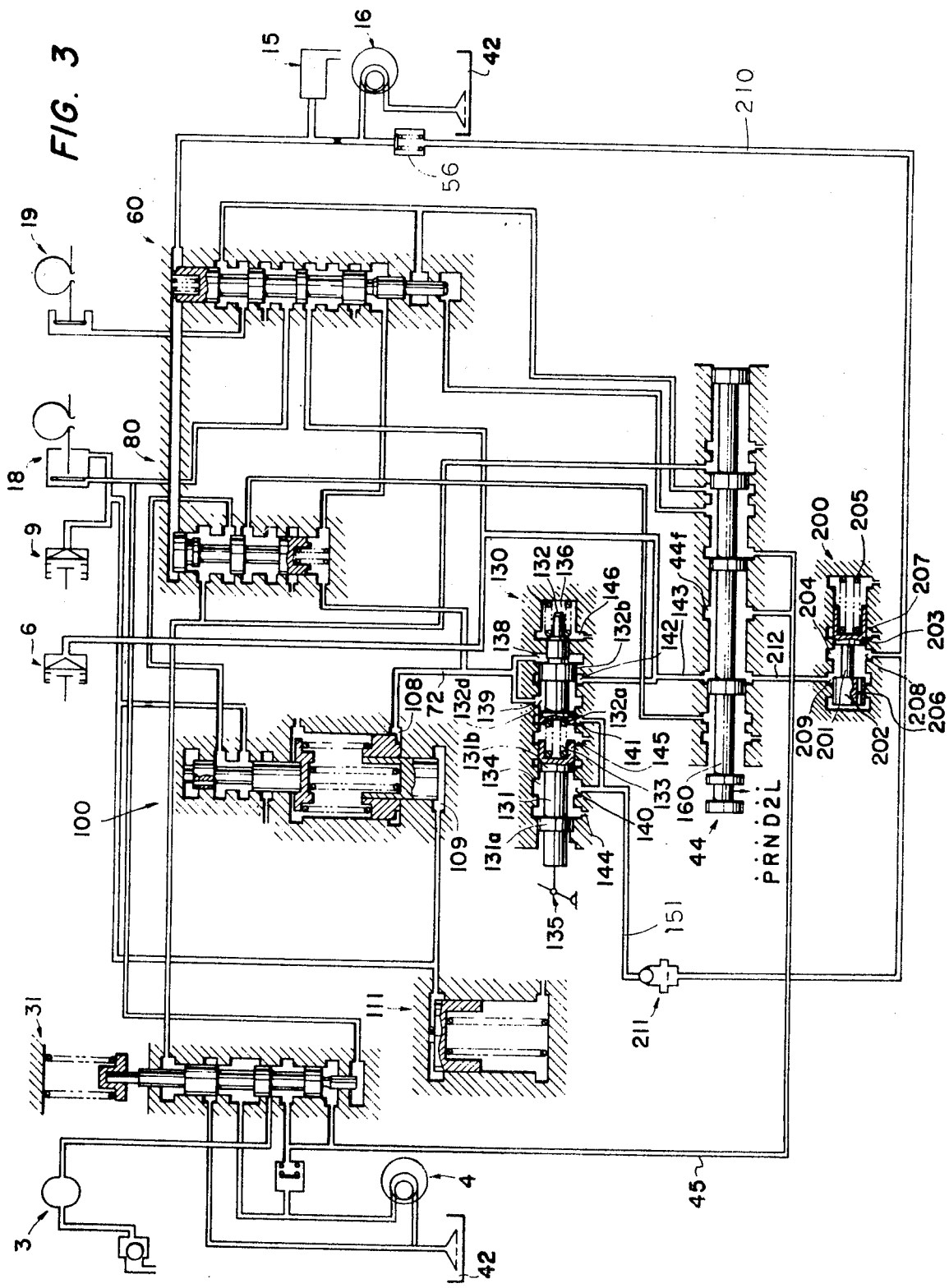
FIGS. 3 and 4 are diagrammatic illustrations of different embodiments of fluid control systems according to the present invention.

Referring to FIG. 3, a different embodiment of the the invention will be described hereinbelow in detail. In FIG. 3, parts which are the same as those shown in FIG. 2 are given the same number. A reducing valve 200 includes a valve spool 201 having a pair of lands 203 and 202 to define therebetween a chamber 204, and a compressed spring 205 interposed between the spool end and internal end face of the valve 200 to normally bias the spool 201 to the left. The land 202 have a small hole 206 to communicate the chamber 204 with another chamber defined between the left end face of the land 202 and the left internal end face of the valve 200.

A port 207 leads to the reservoir 42; port 208 is connected to a conduit 210 which connects the pump 16 and the port 140 of the throttle valve 130 through the check valve 56 and another check valve 211 of inversely operational character to the check valve 56. The port 209 is connected to the manual shift valve 44 through conduit 212.

The operation of the reducing valve 200 is the same as that of the reducing valve 150 of the first embodiment in FIG. 2 except that the fluid pressure in the chamber 132d of the throttle valve 130 is beforehand regulated to a predetermined threshold value by the reducing valve 200 the operation of which is similar to that of the valve 150 as aforementioned. The valve 200 is supplied a line pressure from the pump 4 through conduit 45, chamber 44f of the manual shift valve 44 and conduit 212 or from the pump 16 through conduit 210. Such input pressure within the chamber 204 of the valve 200 is regulated to the predetermined threshold value. The threshold value is translated into exactly the pressure in the chamber 44f of the valve 44 and into the throttle valve 130. In case of the sudden depression of the pedal 135, the excessively increased pressure in the chamber 132d is transmitted through conduit 151, check valve 211 and conduit 210 into the chamber 204 of the valve 200 so that the output pressure from the throttle valve 130 is regulated to the predetermined threshold value. Such output valve pressure is then applied to the valves 100, 80 and 60 to thereby operate in the normal condition particularly in permitting prompt restoring of these device to their original position without any time lag after required sudden acceleration of the vehicle is attained.

Figure 4:
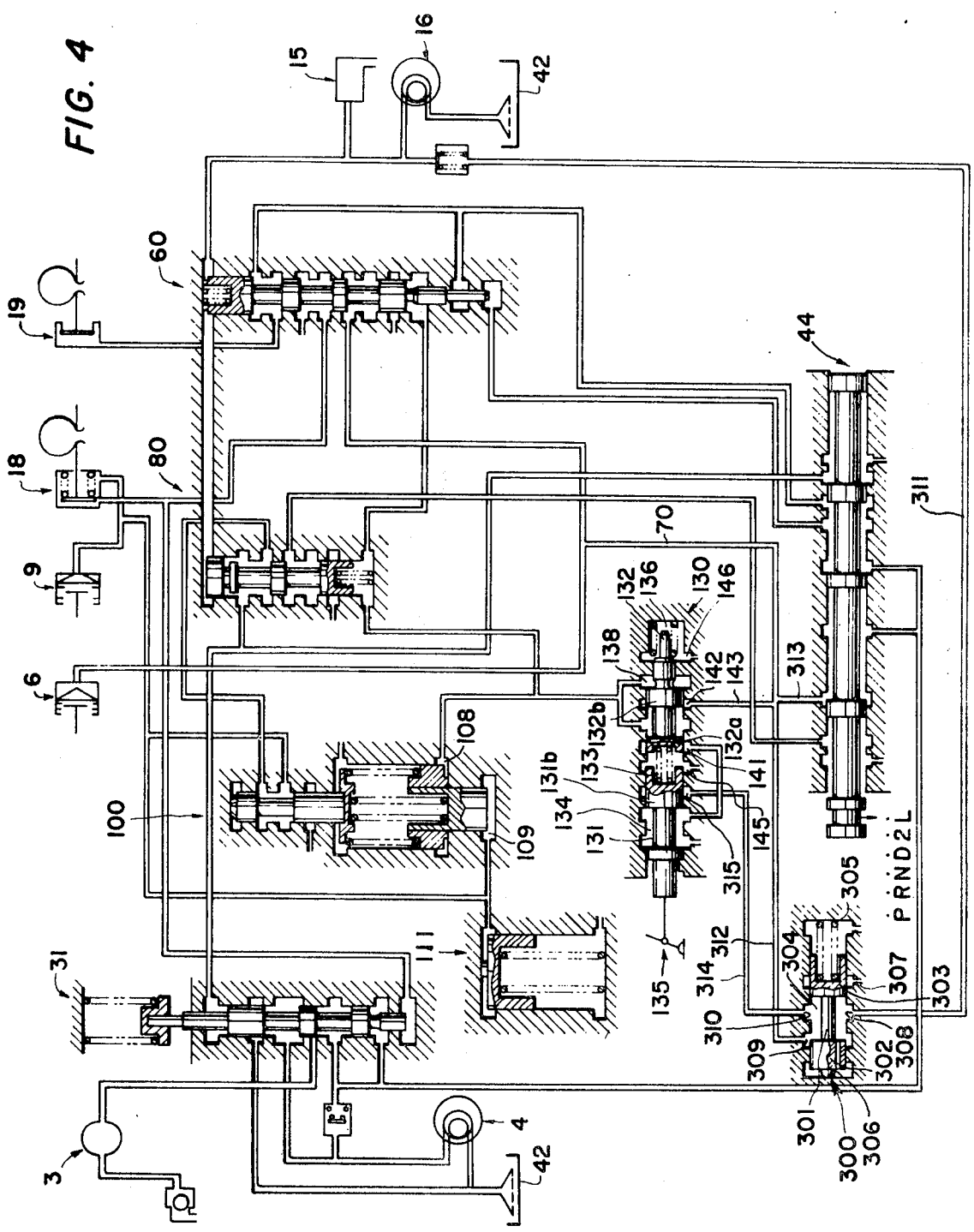

Referring to FIG. 4, still further different embodiment will be decribed hereinbelow. Parts which are the same as those shown in FIG. 2 are given the same number. The other parts are given in a 300 series. A reducing valve 300 includes a valve spool 301 having a pair of lands 302 and 303 to define therebetween a chamber 304, and a compressed spring 305 interposed between the spool end and internal end face of the valve 300 to normally bias the spool 301 to the left. The land 302 has a small hole 306 to communicate the chamber 304 with another chamber defined between left end face of the land 302 and the left internal end face of the valve

300. The valve 300 has further ports 307 to 310. The port 307 leads to the reservoir 42, port 308 is connected to a conduit 311 leading to the pump 16. The port is connected via conduit 312 to conduit 143, 70 and 313. The conduit 313 leads to the valve 44. The port 310 is connected via conduit 314 to a port 315 of the throttle valve 130.

The operation of the reducing valve 300 is the same as that of the reducing valve 200 of the second embodiment in FIG. 3 except that the port 315 and conduit 314 are additionally provided. The chamber 304 of the valve is similarly supplied line pressure through conduit 312 or 311 from the pump 4 or 16 respectively.

Duplicated description will not be required for completely understanding the operation of the valve 300.

Figure 5:
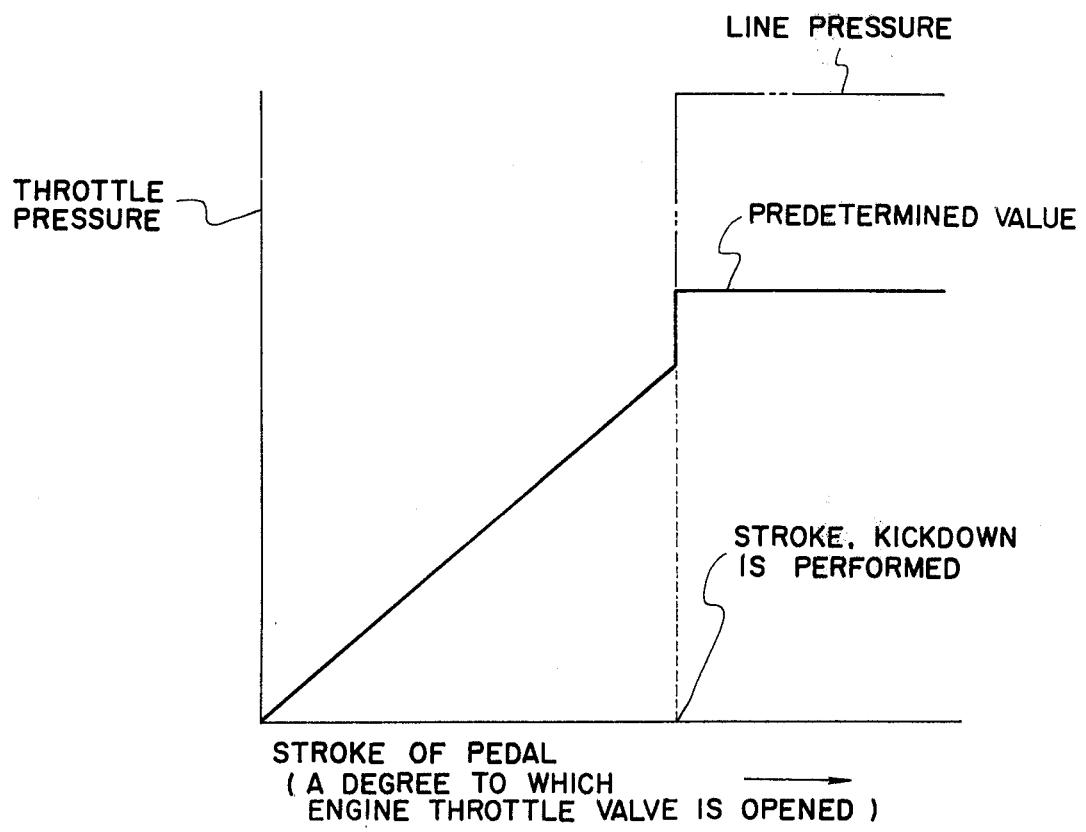
FIG. 5 is a graph showing throttle pressure and pedal strokes which actuate the engine throttle valve.

FIG. 5 is a graph in which will be seen that the throttle pressure indicated by the solid line is regulated to a value which is lower than the line pressure, shown in dot and dash line, in case where the pedal 135 is suddenly depressed for an urgent acceleration of the vehicle.

After such required acceleration is completed, the driver is usually apt to leave his foot in the depressed state for a while. This impose the gear trains an improper action, offering a shock to the passengers.

The present invention provides means to restrict the throttle pressure to a predetermined value which is conveniently overcome by a governor pressure due to such accelerated travelling of a vehicle, as aforementioned.

If the spool 160 of the manual shift valve 44 is shifted to R position of FIG. 2, the rearward travelling of the vehicle is effected. In the mode of operation, the clutch 9 and the brake 19 are in act and the clutch 6 and brake 18 are in the rest position. Fluid controlling for such operation of the gear trains will be readily understood from the foregoing.

Applicant's system operates in the following manner:

Valve 60 at the right in FIG. 2 is provided for achieving two controlling modes of operation to govern the brakes 19 and 18.

In the first mode of operation, spool 61 is kept in the position shown and the brake 19 is so tightened that carrier 12 is kept stationary, while the clutch is tightened and clutch 9 and brake 18 are both slackened. As a result, the low position or L position of the gear train in FIG. 1 is effected. In this position, the first sun gear 10 is a driving gear, and the second sun gear 8 is freed, while carrier 12 is stationary. The resulting L position of the gear train is fixed to continue until manual shifting spool 160 of valve 44 is shifted from the L position to other positions.

In the second mode of operation, spool 61 is shifted downward by the proportionally increased governor pressure in chamber 63e so that brake 19 is slackened while brake 18 is tightened by being supplied with line pressure through the valve 60 in downward shifted position. Clutch 6 still remains tightened and clutch 9 remains slackened. As a result, the second position is effected in the gear train. In this position, the first sun gear is also a driving gear and the second sun gear is stationary, while carrier 12 is freed. However, in order to achieve this, the manually shifting valve spool 160 must have been in 2 or D position as hereinbelow described. In the 2 or D position, the upward urging force relative to spool 61 is decreased in the absence of line pressure in chamber 63b, or in chambers 63a and 63b. As a result, spool 61 is able to be shifted downward by a governor pressure in chamber 63e which attained to a predetermined value.

Valve 80 is provided for governing the second clutch 9 and the first brake 18. Tightening of clutch 9 and slackening of the brake 18 must take place always together. In order to achieve this, clutch 9 and disengaging chamber 18d of brake 18 are fluidly connected to each other as stated in the foregoing in the specification. From tightening of clutch 9 and slackening of the brake 18 there results the top position of the gear train, with the clutch 6 being also tightened and both brakes 18 and 19 being slackened. In the mode of operation of the gear train, all parts of the gear train are locked as a unit. The input shaft 1 and output shaft 13 are rotationally identical.

Spool 81 is normally spring-biased toward the position shown with exposing the land 81c against the governor pressure in chamber 63e while land 81a is exposed against the throttle pressure in chamber 83a. In a case where the above governor pressure in chamber 63e overcomes the throttle pressure in chamber 83a, spool 81 is downward shifted with land 81c, isolating the chamber 83c from the reservoir and with land 81b permitting connection of both conduits 84 and 86. Such connection of the conduits enables the fluid pressure in chamber 83c to be transmitted into the clutch 9 and disengaging chamber 18d of brake 18, so that clutch 9 is tightened and brake 18 is slackened. In order to achieve this, the manual shifting spool 160 must, beforehand, be shifted to the D position to connect conduit 84 to the line pressure in chamber 44f.

The above-mentioned and downwardly shifted position of the spool 81 causes the clutch 9 and brake to operate as above and the top position of the gear train thereupon is effected. In order to achieve this in the gear train, the other clutch 6 also should be tightened. Spool 61 is in downward shifted position in the absence of fluid pressure in chambers 63a and 63b by the governor pressure in chamber 63e.

In the above mode of operation of the valve 80, depression of pedal 135 by the operator causes increase of throttle pressure in chamber 83a. If such increase in pressure is of a value over a predetermined value which is proportional to the governor pressure in chamber 63e, the spool 81 is upward shifted into the position shown and the lower second position is effected in the gear train.

If the above throttle pressure further increases up to a second threshold value in proportion to a greater degree of depression of pedal 135, spool 61 is correspondingly shifted upward to the position shown in FIG. 2, and the further lower speed travelling position, — namely, second position — is effected in the gear train.

From the foregoing it will be noted that in D position of spool 160, the control system is able to cause the gear train in FIG. 1 to vary from L position to the second 2 position and further to the top position in response to the increasing governor pressure in chamber 63e, reversal taking place in response to the throttle pressure in chambers 83a or/and 63a.

The provision of valve 100 is to effect gradual increase of output pressure in chamber 101e, so that clutch 9 and brake 18 gradually operate in case of change of mode of operation to eliminate inertial shock in the travel of the vehicle.

A principal object of the invention is the provision of the reducing valve 150 which serves to restrict the maximum of the throttle pressure in chamber 132d in the case where pedal 135 is depressed a greater distance with the land 131 moved to the right beyond port 144 thereby to subject the pressure in chamber 132d to the regulating operation by valve 150. Such regulation is intended to cause the throttle pressure in chamber 83a immediately to be overcome by the governor pressure in chamber 63e after the desired acceleration of the vehicle has been attained. This is effective to obtain smoothness in travelling of the vehicle.

What is claimed is:

1. A fluid pressure control system for automatic fluid transmission comprising
    a fluid pressure source;
    a fluid pressure regulating valve for regulating the hydraulic fluid from said fluid pressure source to a particular line pressure;
    a plurality of frictional engaging means actuated by said line pressure from said pressure regulating valve for attaining a particular gear ratio within the gear train of said transmission interposed between an input shaft and an output shaft;
    a governor valve for governor pressure which is increased or decreased in response to the rotational speed of said output shaft;
    a manual shift valve operatively connected to said fluid pressure regulating valve for supplying said line pressure to said plurality of frictional engaging means;
    a throttle valve fluidically connected to said manual shift valve for generating a throttle pressure responsive to an engine throttle valve;
    a shift valve actuated in response to said governor pressure and said throttle pressure for automatically selectively actuating said plurality of frictional engaging means; and
    a reducing valve for supplying said throttle pressure to said shift valve when said throttle pressure is below a predetermined value and for supplying a predetermined threshold pressure to said shift valve upon kick-down operation by non-activating said throttle valve in order not to exceed said predetermined valve of throttle pressure.

2. A fluid pressure control system for automatic transmissions as set forth in claim 1 wherein said reducing valve is interposed between the throttle valve and the reservoir to permit the throttle pressure to escape to the atmospheric pressure as the throttle pressure exceeds said calibrated threshold value.

3. A fluid pressure control system for automatic transmissions as set forth in claim 1 wherein said reducing valve is also interposed between said pressure source and the said manual shift valve.

4. A fluid pressure control system for automatic transmission as set forth in claim 1 wherein said reducing valve is interposed between the said manual shift valve and the throttle valve.

* * * * *

UNITED STATES PATENT OFFICE
CERTIFICATE OF CORRECTION

PATENT NO. : 4,008,630
DATED : Feb. 22, 1977
INVENTOR(S) : Noboru Murakami, et al It is certified that error appears in the above-identified patent and that said Letters Patent are hereby corrected as shown below:

Claim 1, last line "valve" should read  - value - ;

Claim 4, line 3 "also" omitted after "is" .

Signed and Sealed this

Nineteenth Day of April 1977

[SEAL]

Attest:

RUTH C. MASON
*Attesting Officer*

C. MARSHALL DANN
*Commissioner of Patents and Trademarks*